United States Patent [19] [11] 4,065,638
Manriquez [45] Dec. 27, 1977

[54] DEMOUNTABLE BEARING AND SHAFT ASSEMBLY

[75] Inventor: Ralph F. Manriquez, San Jose, Calif.

[73] Assignee: International Computers Limited, London, England

[21] Appl. No.: 698,630

[22] Filed: June 22, 1976

[51] Int. Cl.$^2$ .............................................. H04L 13/04
[52] U.S. Cl. ............................ 178/23 R; 197/DIG. 1
[58] Field of Search ......................... 197/145, DIG. 1; 308/22, 24, 30, 34; 178/23 R; 340/357, 358

[56] References Cited

U.S. PATENT DOCUMENTS

| | | | |
|---|---|---|---|
| 923,951 | 6/1909 | Crutchley | 197/145 |
| 3,562,738 | 2/1971 | Raschke | 340/357 |

FOREIGN PATENT DOCUMENTS

| | | | |
|---|---|---|---|
| 84,461 | 3/1920 | Switzerland | 197/145 |

*Primary Examiner*—Thomas A. Robinson
*Attorney, Agent, or Firm*—Hane, Roberts, Spiecens & Cohen

[57] ABSTRACT

A bearing assembly and drive shaft particularly useful in connection, for example with a point-of-sale terminal in which the drive shaft is held within the terminal by a simple bowed spring retainer which spring-loads the bearing body elements against the side walls of the print stations of the terminal and which is easily removable so that the bearing assemblies and shaft can be removed from, and inserted in, the terminal by a simple bayonet type action. This concept provides a drive shaft in a POS terminal which facilitates maintenance of the terminal in situ, if desired.

6 Claims, 7 Drawing Figures

10
12
14
16
18
20
22
24
26
28
30
32
34
38
40
42

DEMOUNTABLE BEARING AND SHAFT ASSEMBLY

BACKGROUND OF THE INVENTION

1. Field of Invention

This invention relates in general to new and improved demountable bearing assemblies and shafts useful in mechanisms, such as in a point-of-sale type data terminal where such shafts are used for driving various means for forming records of all the transactions entered into the point-of-sale terminal.

2. Description of the Prior Art

In electronic cash registers or POS terminals provisions are made for printing a receipt, an audit trail or for printing on forms, such as a bill of sale or a sales order form.

In the U.S. Pat. No. 3,825,681 of Cederberg et al, the POS data terminal disclosed therein has three stations: a receipt station where the customer's receipt is printed (if a receipt is required), an audit station where the storekeeper's record (audit trail) of all the transactions is printed, and a form station where the customer's order form or bill of sale is printed, if such is required. In the subject patent, a motor driven main drive shaft was provided with solenoid operated clutch means coupled thereto. The clutch means, through actuation of selected solenoids, couple the respective driving mechanisms in the respective print stations in response to the requirements of the information being processed in the terminal.

While the main drive shaft, as shown and briefly described in the subject patent, proved to be feasible, it was found that maintenance of the terminal posed a problem, and one of the reasons for this was the difficulty of removing the drive shaft, if that were necessary. This prevented a maintenance man from repairing the terminal in situ.

This invention is directed to the concept of providing demountable bearing assemblies for a drive shaft which can be easily inserted in the terminal and easily removed therefrom to facilitate maintenance of the terminal.

SUMMARY OF THE INVENTION

The goals of this invention are accomplished in the embodiment disclosed by providing a main drive shaft of a POS terminal with bearing assemblies which hold the shaft in the terminal by the use of a simple bowed spring retainer rings which spring load the bearing assemblies against the side walls of the print stations of the terminal. The bowed retainer ring is removable from the bearing assembly and when removed, the bearing assemblies and shaft can be inserted in, and removed from, the terminal by a bayonet-type action.

DESCRIPTION OF THE PREFERRED EMBODIMENT

To illustrate a data terminal in which the present invention may be used, a general description of such a terminal is set forth first.

Figure 1:
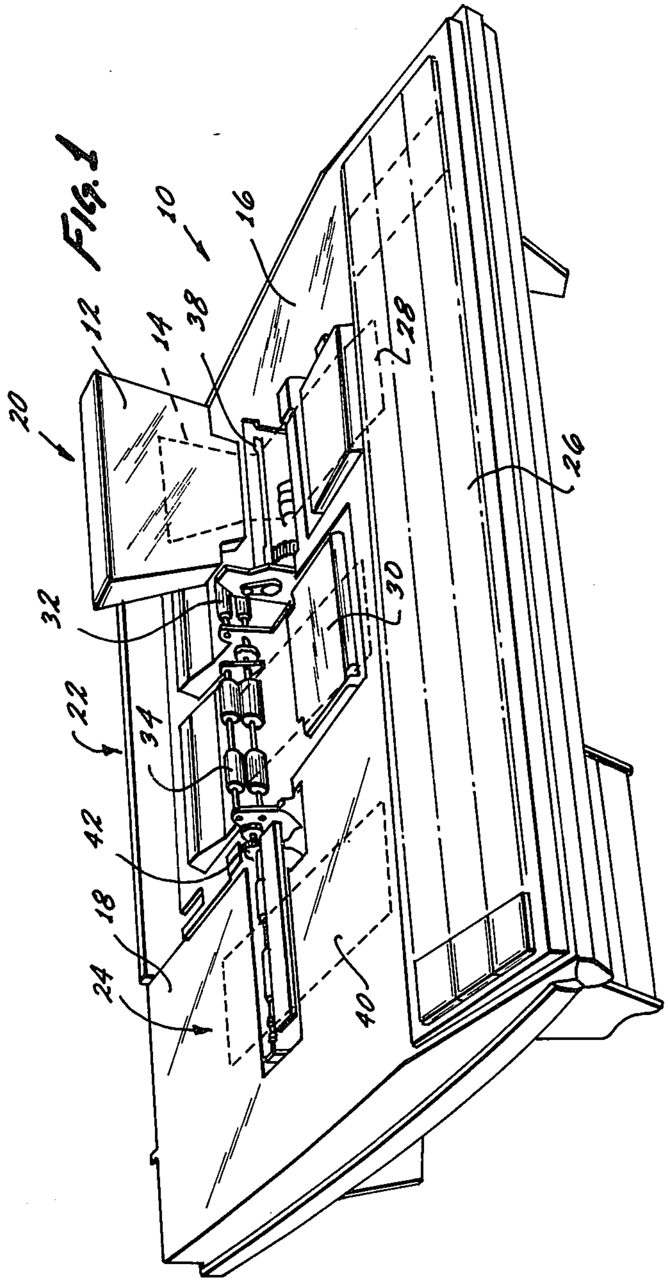
FIG. 1 is a perspective view of a data terminal schematized and cutaway to illustrate the relationship of the printing stations and in which the demountable bearing assembly and shaft forming the present invention is incorporated to drive components of said stations and to transport the matrix printer thereto.

In FIG. 1 a data terminal 10 with the cover removed for the purposes of clarity, is shown as comprising, overall, a carriage 12, on which is mounted a suitable matrix print head 14 shown in phantom for clarity in depicting the other features of the terminal, movable laterally with respect to the frame 16, a work level surface 18 (partially shown), having three print stations 20, 22 and 24, and an appropriate keyboard 26. The three print stations 20, 22 and 24 are, respectively, a receipt station where the customer's receipt is printed (if a receipt is required), an audit station where the storekeeper's record (audit trail) of all transactions is printed, and a form station where the customer's order form or bill-of-sale is printed, if required.

By this arrangement, the carriage 12 and matrix print head 14 will not only move across the receipt and audit stations in pairs, but also across the form and audit stations in pairs, as well as traversing each of the stations individually so that appropriate rows and columns of data entered into the data terminal of the keyboard 26, or from a remote computer, is appropriately printed out.

In the embodiment shown, a receipt 28, if required, is printed in the receipt station 20 and the audit trail 30 is printed in the audit station 22 as the two record media are moved forward, i.e., in the direction of the keyboard 26 from a suitable supply, such as rolls of paper, by suitable roller feed mechanisms 32 and 34. These roller feed mechanisms are driven by a demountable main drive shaft 36 (see FIGS. 2–6) which is motor-operated and suitable clutch means are provided so as to directly connect the feed mechanisms to the shaft. The audit trail is rolled onto a spool, partially shown in FIG. 1, while a receipt 28 is severed by a suitable cutting mechanism 38, when a complete transaction is recorded. When the carriage 12 and print head are positioned to the left of that shown, a form 40, such as a customer order form or bill-of-sale, is printed in station 24 at the same time the audit trail is being printed. Also, the form station is provided with a pair of electronic sensing means which determine when a form is properly located in the form station, otherwise the terminal is inhibited from operating; suitable electronics being provided for this purpose. The form travels in a direction opposite from the direction of travel of the audit trail by suitable gearing 42 coupled to the main drive shaft 36, the latter moving the form and the audit trail or the audit trail alone, as the case may be, to form rows and columns of data as determined by the input to the keyboard or from the remote computer.

The matrix print head 14 is capable of printing on the various media at the various stations and for the proper positioning of the rows and columns of characters on the record media, suitable strobe means and suitable electronics cooperating therewith are provided. For a more detailed description of the various elements so far described, reference is made to the U.S. Pat. 3,838,250 of Naas et al, supra, directed to the control for matrix printing assembly, 3,837,461 of Waibel, which shows one form of a print station for a matrix printer, and 3,834,638 of Savage et al, which shows one embodiment of an assembly for spooling the audit trail, and again to 3,825,681 of Cederberg et al. supra.

While the foregoing shows details of operation of the various elements of the data terminal, no further description is deemed necessary herein, since this invention is directed specifically to the concept of providing a demountable drive shaft to drive the mechanisms of the three print stations which make the terminal easily serviceable and maintainable.

Figure 2:
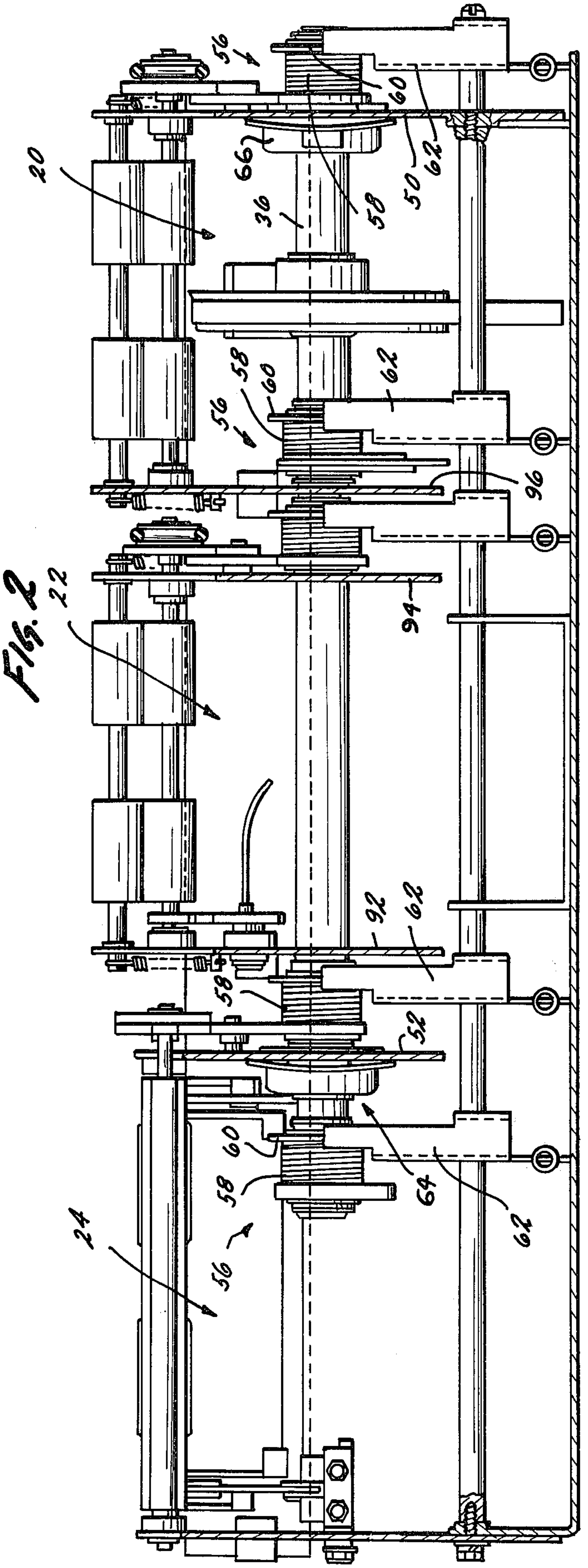
FIG. 2 is a plan view, with parts removed, and partially schematized, to show the relationship of the bearing assemblies and shaft out and away from the data terminal shown in FIG. 1.

Turning now specifically to FIG. 2, which shows the print stations 20, 22 and 24 removed from the data terminal 10 with parts omitted to more clearly show the main demountable drive shaft 36 in its relationship to the print stations, the demountable drive shaft 36 extends transverse of the print stations 20 and 22 and beyond a plate forming the right side wall 50 of print station 20 and through a plate forming the right side wall 52 and a short distance into the form station 24. The drive shaft is connected to suitable drive means, as previously mentioned, a part of the gearing being shown at 54 in FIG. 4.

Clutch means 56 (five shown) each comprises a coil spring 58 wrapped around a sleeve with a clutch index wheel 60 engageable by a clutch arm 62 which is, in turn, connected to a solenoid (not shown) and which, in response to an appropriate signal, rotates the record media moving means in each of the stations to move the record media as previously described. Since FIG. 2 is simply to show the working environment in which the demountable shaft and bearing means are placed, no further description is deemed necessary herein.

Figure 3:
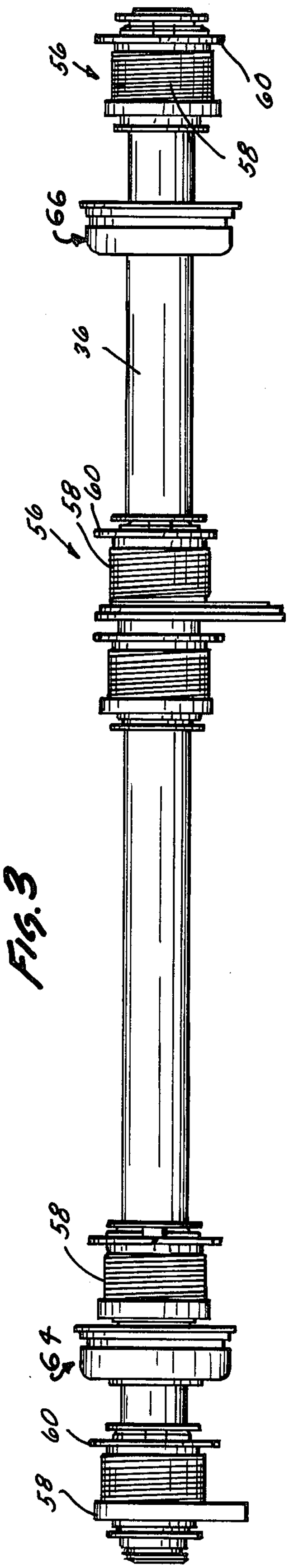
FIG. 3 is a view of the entire shaft removed from the print station assembly of FIGS. 1 and 2 but containing a portion of the clutch means thereon.

As explained hereinbefore, one of the problems in the prior art terminal was the removal of the main shaft and bearings for repair. The purpose of this invention is to provide a drive shaft which is readily demountable from the terminal so that the terminal can be serviced in situ, if necessary, by simply removing the drive shaft and bearings and replacing them with similar bearings and shaft. Thus, the down time of the terminal is lessened and FIG. 3 shows such a demountable drive shaft separate and apart from the print stations as it could be used as a replacement part for the shaft in FIG. 2.

It can be seen that the drive shaft 36 is provided with the sleeves and coil springs 58, and clutch wheel 60 which form part of the clutch means, and is also provided with a pair of bearing assemblies 64 and 66 in which the shaft is journalled and spaced-apart to accommodate the side walls 50 and 52 of the print stations.

Figure 4:
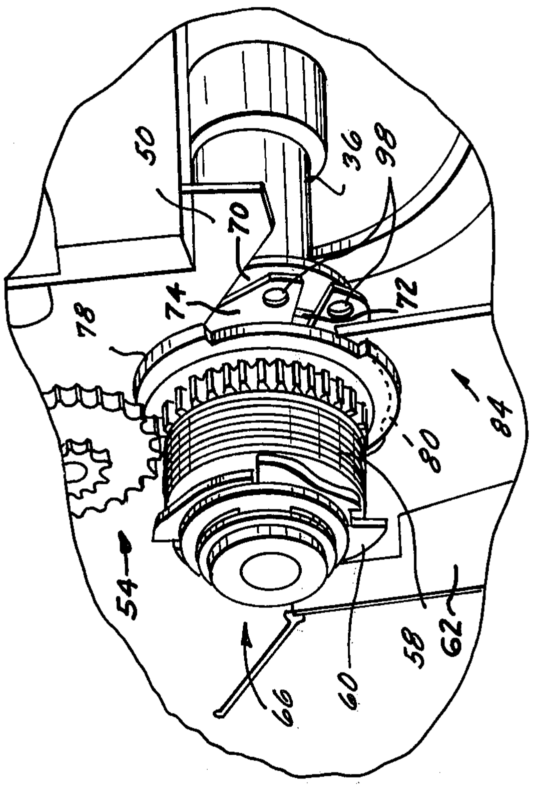
FIG. 4 is an enlarged detail view of one end of the shaft and bearing assembly extending beyond the receipt station, i.e., the right-hand end of the shaft shown in FIGS. 2 and 3.
Figure 5:
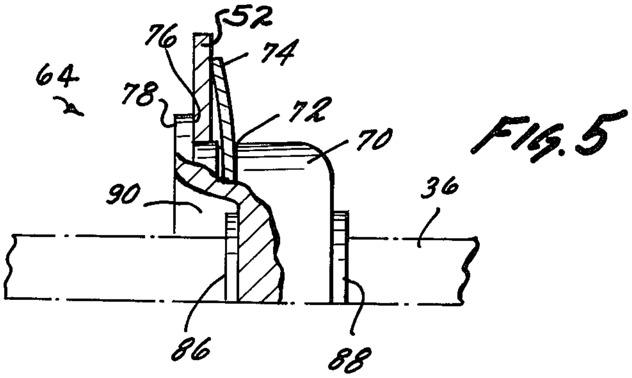
FIG. 5 is an enlarged detail elevational view of a portion of the shaft and another bearing assembly.
Figure 6:
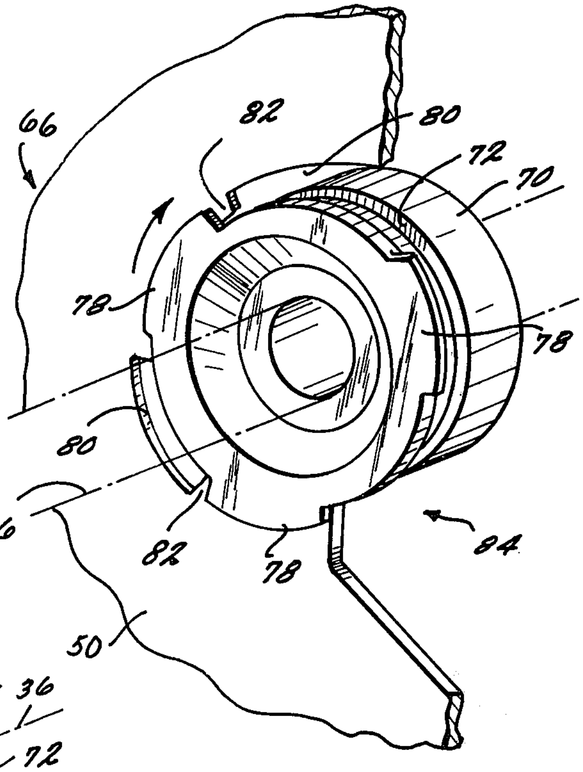
FIGS. 6 and 7 are perspective views of a portion of an end plate and bearing assembly showing the manner in which a bearing assembly is held in the plate and how the bearing is being rotated for removal from the plate.
Figure 7:
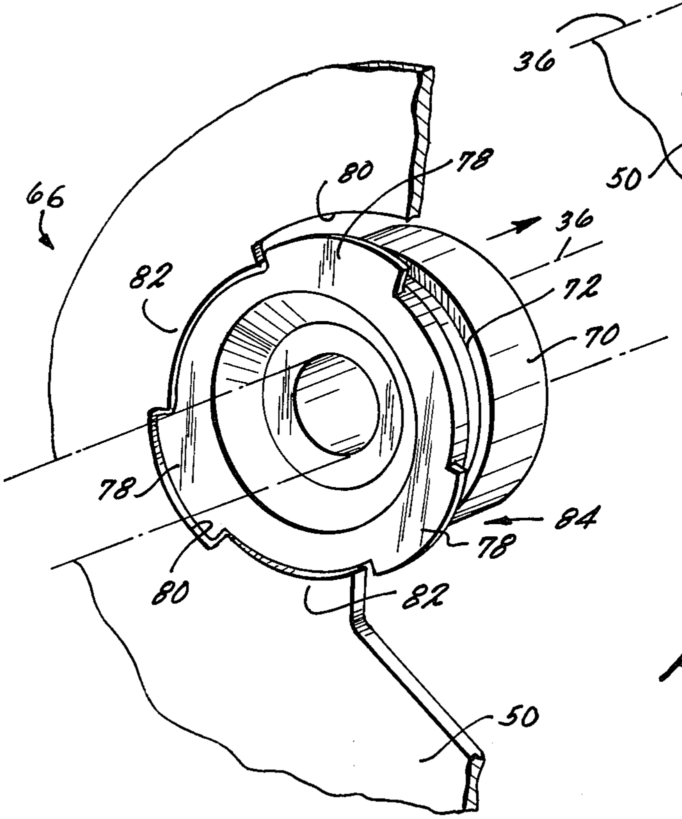

Now as to FIGS. 4, 5 and 6, which show a bearing assembly, FIGS. 4 and 6 showing the assembly 66 and FIG. 5 showing the assembly 64 (the disposition of the parts being chosen to correspond in all these FIGURES) it can be seen that each bearing assembly 66 and 64 comprises a relatively flat disc-like bearing body element 70, of conventional bearing material, with an outer groove 72 circumferentially on the outer periphery thereof. This groove 72 accepts a bowed spring retainer ring 74, the inner diameter of which mates with the bottom of the groove 72 and the outer diameter of which extends outwardly forming the largest diameter of the bearing assembly so as to resiliently engage the side frames 50 and 52 (side frame 52 being shown in FIGS. 4 and 6; side frame being shown in FIG. 5) and urge the latter against the shoulder 76 which is formed by three equally spaced-apart, ears 78. These ears 78 complement a pair of equally spaced cutaway portions 80 formed by two tabs 82 formed on the periphery of slots or notches 84 formed in the back edges of the side frames opening outwardly, such as shown in FIGS. 6 and 7, to form a bayonet type assembly fitting for the bearing assemblies with the side frame notches 84 large enough to permit insertion and removal of the bearing assemblies and shaft. As best shown in FIG. 4, the notches 84 are formed to permit the passage of the shaft 36 but the lowermost one of the tabs 82 is formed to restrict the opening of the notch 84 to retain the bearing assemblies 64 and 66 when these assemblies are in position in the side frames 50 and 52.

Specifically in FIG. 5, the disc-like body element 70 is positioned longitudinally on the main shaft 36 by a pair of C-rings 86 and 88 of a conventional type, which seat in a pair of grooves in the main shaft provided for that purpose, one C-ring on each side of the body element. A recess 90 is provided in one side of the body element so that the C-ring 86 will be wholly within the body element. In FIG. 5, representing the bearing assembly adjacent the side wall 52 of the form station 24, since this bearing assembly is provided with a pair of C-ring retainers, the shaft 36 is positioned relative to the side frame wall 52 and also positioned relative to the side frame 50 since longitudinal movement between the bearing assembly and the side frame is prevented by the bowed retainer and the ears. Thus, C-rings are not necessary to locate the bearing assembly 66 at the side wall 50.

Taking FIGS. 2, 5 and 6 together, it can be seen that the drive shaft 36 is suitably mounted within the print station assembly with the bowed retainers 74 of each bearing assembly engaging the side walls 50 and 52, respectively. Other side walls 92, 94 and 96 (FIG. 2) have suitable open end notches, identical to notch 84, as shown in FIGS. 5 and 6, to accommodate the removal of the shaft 36 and bearing assemblies. When it is desired to remove the shaft, it is simply necessary to remove the bowed retainer rings 74 from each bearing assembly by the use of a conventional C-ring removal tool operable in holes 98 (FIG. 4). With the bowed retainer rings thus removed, the shaft and bearing assemlies are rotated clockwise (as shown in FIG. 6), typical of a bayonet fitting, so that the three ears 78 will suitably clear the tabs 82, as shown in FIG. 6. The process of removal is, of course, reversed for the insertion of the shaft and bearing assemblies into the terminal.

What is claimed is:

1. Demountable bearing and shaft assembly including a shaft of predetermined diameter; at least one bearing member for the shaft having a cylindrical body portion with a shaft-receiving aperture longitudinally therethrough, at least two ears forming an incomplete flange about the body portion at one end thereof and a circumferential groove in the body portion spaced away from the flange; a mounting plate having opposed surfaces forming a side wall perpendicular to the longitudinal axis of the shaft having a bearing locating aperture formed therein to receive and locate the body portion of the bearing member, the aperture having cutaway portions proportioned and positioned to correspond with the ears of the flange and a bowed spring retainer engageable in the groove of the body portion; the bearing member in use being engaged with the plate by the passage of the ears of the flange through the cutaway portions of the aperture, the bearing member thereafter being rotated in the aperture to bring the ears into abutting engagement with one surface of the plate of those positions between the cut-away portions, the spring retainer then contacting the opposite surface of the plate to maintain the member in the plate by spring tension.

2. An assembly as claimed in claim 1 in which the mounting plate has a notch extending from the aperture to one edge of the plate, the notch at least adjacent the aperture being sufficiently wide to permit only the shaft to pass out of the aperture.

3. An assembly as claimed in claim 2 in which the bowed spring retainer is removeably engaged with the groove in the body portion.

4. An assembly as claimed in claim 3 in which the retainer is a C-ring having a dished configuration.

5. An assembly as claimed in claim 1 further including means for locating the shaft longitudinally with respect to the bearing member.

6. An assembly as claimed in claim 5 in which the shaft has a pair of grooves spaced apart by a distance determined by the length of the bearing member in the direction of the shaft axis and including a pair of C-rings engageable with each groove in the shaft, the bearing member in use being positioned between the C-rings engaged with the draft.

* * * * *